United States Patent
Blivet

(10) Patent No.: US 6,517,115 B1
(45) Date of Patent: Feb. 11, 2003

(54) DEVICE FOR QUICK CONNECTION OF A TUBE TO A RIGID ELEMENT

(75) Inventor: Philippe Blivet, Rennes (FR)

(73) Assignee: Legris SA, Rennes (FR)

(*) Notice: Subject to any disclaimer, the term of this patent is extended or adjusted under 35 U.S.C. 154(b) by 0 days.

(21) Appl. No.: 09/889,221

(22) PCT Filed: Jan. 17, 2000

(86) PCT No.: PCT/FR00/00087
§ 371 (c)(1),
(2), (4) Date: Jul. 12, 2001

(87) PCT Pub. No.: WO00/45081
PCT Pub. Date: Aug. 3, 2000

(30) Foreign Application Priority Data

Jan. 26, 1999 (FR) ............................... 99 00826

(51) Int. Cl.⁷ ............................................... F16L 57/00
(52) U.S. Cl. ........................... 285/23; 285/18; 285/319; 285/340; 285/921
(58) Field of Search ................. 785/23, 18, 319, 785/340, 921

(56) References Cited

U.S. PATENT DOCUMENTS

| 3,447,819 | A | | 6/1969 | Borsum et al. | |
|---|---|---|---|---|---|
| 4,135,745 | A | * | 1/1979 | Dehar | 285/319 |
| 4,600,223 | A | * | 7/1986 | de Vries | 285/319 |
| 4,749,214 | A | * | 6/1988 | Hoskins et al. | 285/4 |
| 4,846,506 | A | * | 7/1989 | Bocson et al. | 285/4 |
| 5,029,908 | A | * | 7/1991 | Belisaire | 285/323 |
| 5,096,235 | A | * | 3/1992 | Oetiker | 285/308 |
| 5,193,857 | A | * | 3/1993 | Kitamura | 285/319 |
| 5,197,770 | A | * | 3/1993 | Knapp | 285/353 |
| 5,314,216 | A | * | 5/1994 | Umezawa | 285/319 |
| 5,361,283 | A | * | 11/1994 | Attix | 376/446 |
| 5,367,548 | A | * | 11/1994 | Attix | 376/446 |
| 5,413,387 | A | * | 5/1995 | Bartholomew | 285/319 |
| 5,472,016 | A | * | 12/1995 | Szabo | 138/89 |
| 5,487,572 | A | * | 1/1996 | Combot-Courrau et al. | 285/308 |
| 5,505,501 | A | * | 4/1996 | Seabra | 285/322 |
| 5,553,901 | A | * | 9/1996 | Serot | 285/340 |
| 5,695,224 | A | * | 12/1997 | Grenier | 285/104 |
| 5,911,443 | A | * | 6/1999 | Le Quere | 285/3 |
| 5,988,705 | A | * | 11/1999 | Norkey | 285/319 |
| 6,312,019 | B1 | * | 11/2001 | Nakazumi et al. | 285/39 |

FOREIGN PATENT DOCUMENTS

| CH | A 264274 | 1/1950 |
|---|---|---|
| EP | A 0766033 | 4/1997 |
| FR | A 2767181 | 2/1999 |
| WO | A 8809459 | 12/1988 |

* cited by examiner

Primary Examiner—J. J. Swann
Assistant Examiner—Carlos Lugo
(74) Attorney, Agent, or Firm—Birch, Stewart, Kolasch & Birch, LLP

(57) ABSTRACT

The device comprises a tubular insert (1) possessing external means (2) for fixing it in a bore (34) of the rigid element (30) and internal means for axially locking the tube inside the insert (1). The axial locking means comprise a sleeve (69) disposed inside the tubular insert (1) and possessing a broad end arranged to bear against an internal abutment member (75) of the tubular insert (61) and a narrow end that is elastically deformable in a radial direction between a small rest configuration where it forms an abutment for a shoulder (93) of the tube (90) and an enlarged elastically deformed configuration allowing the shoulder of the tube to pass through while it is being inserted.

18 Claims, 5 Drawing Sheets

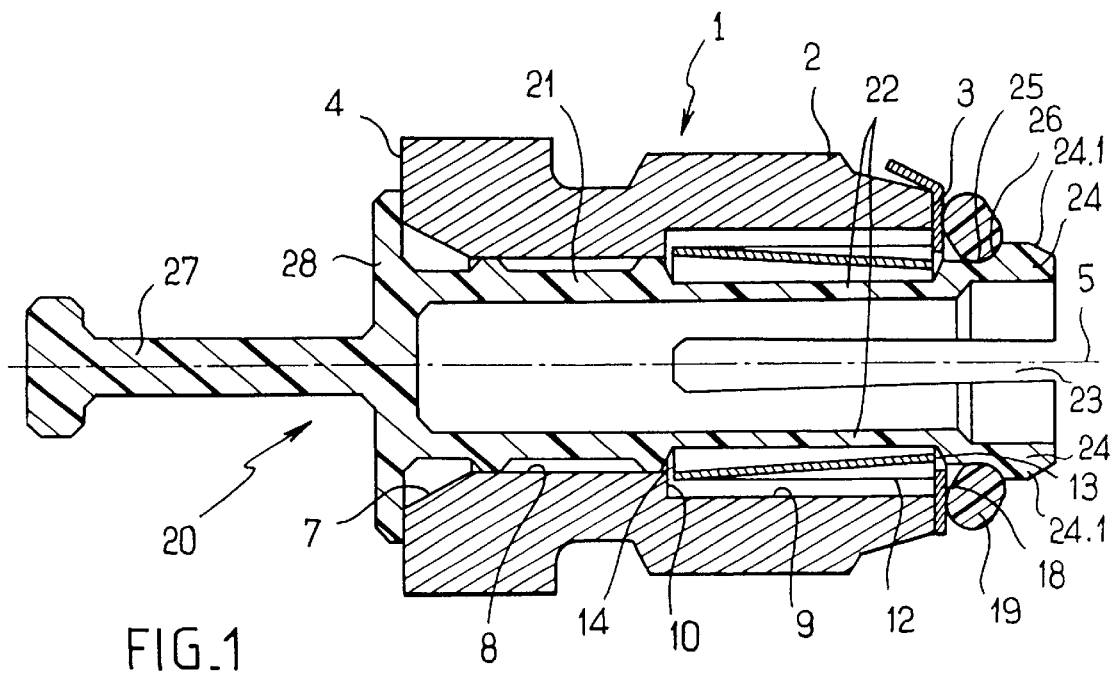
FIG_1
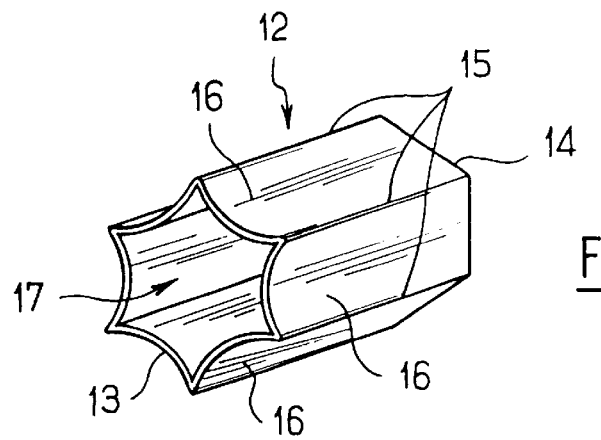
FIG_2
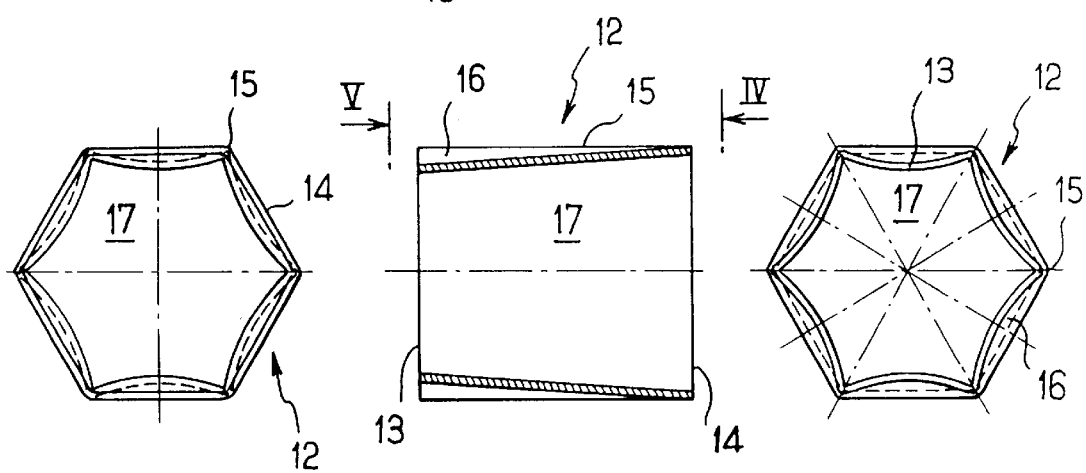
FIG_4  FIG_3  FIG_5

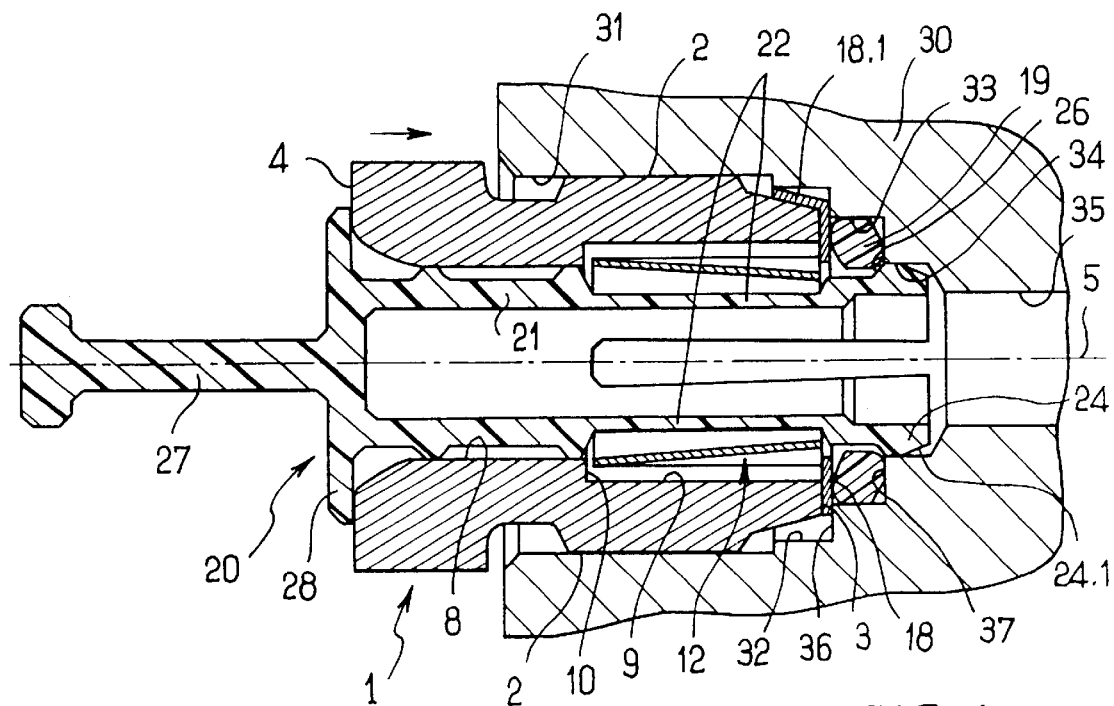
FIG_6
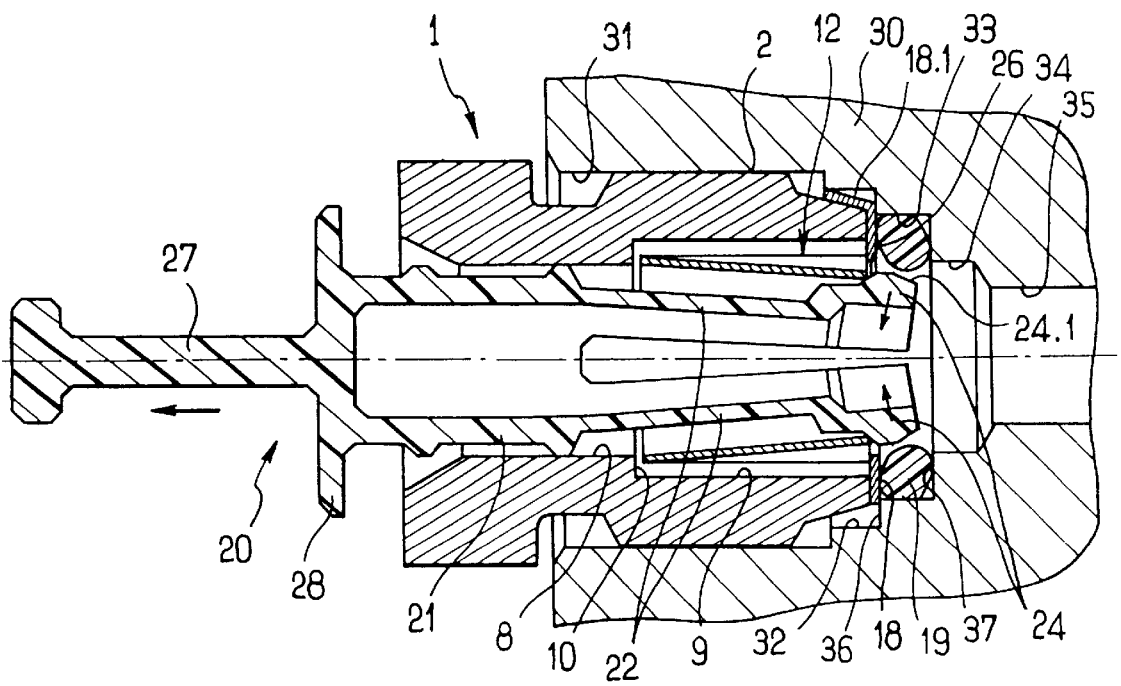
FIG_7

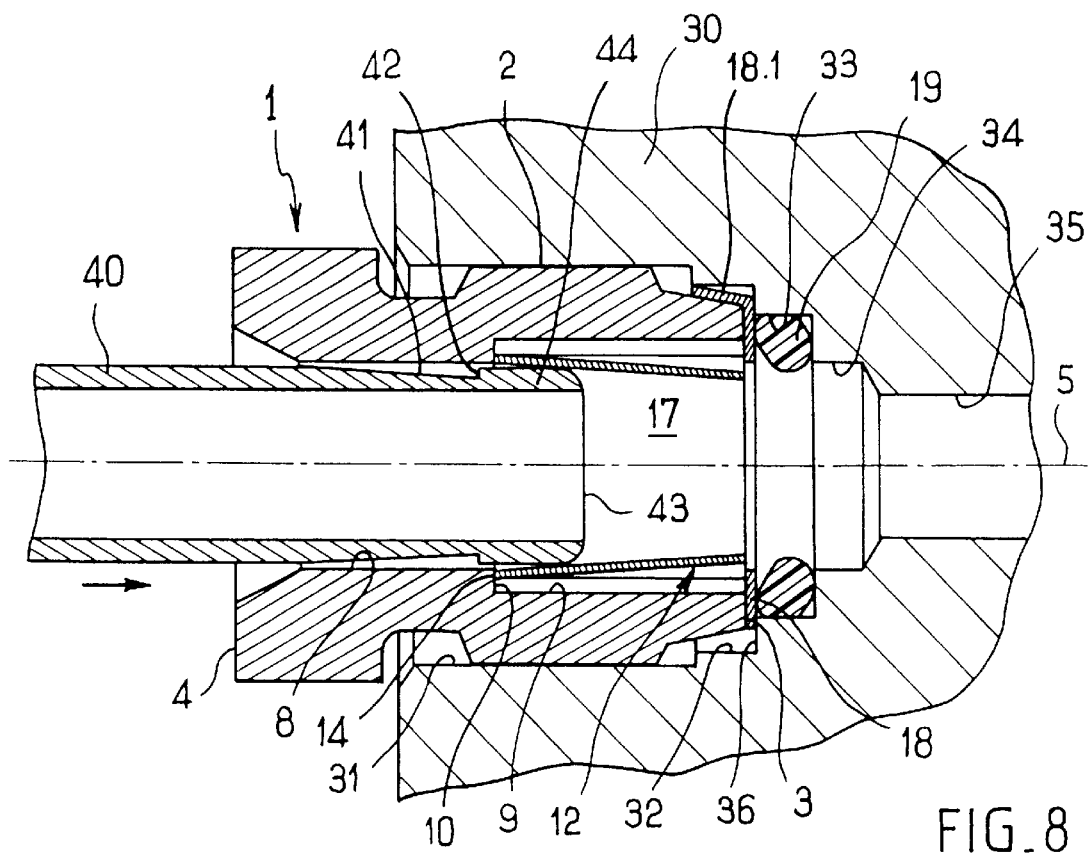
FIG_8
FIG_9

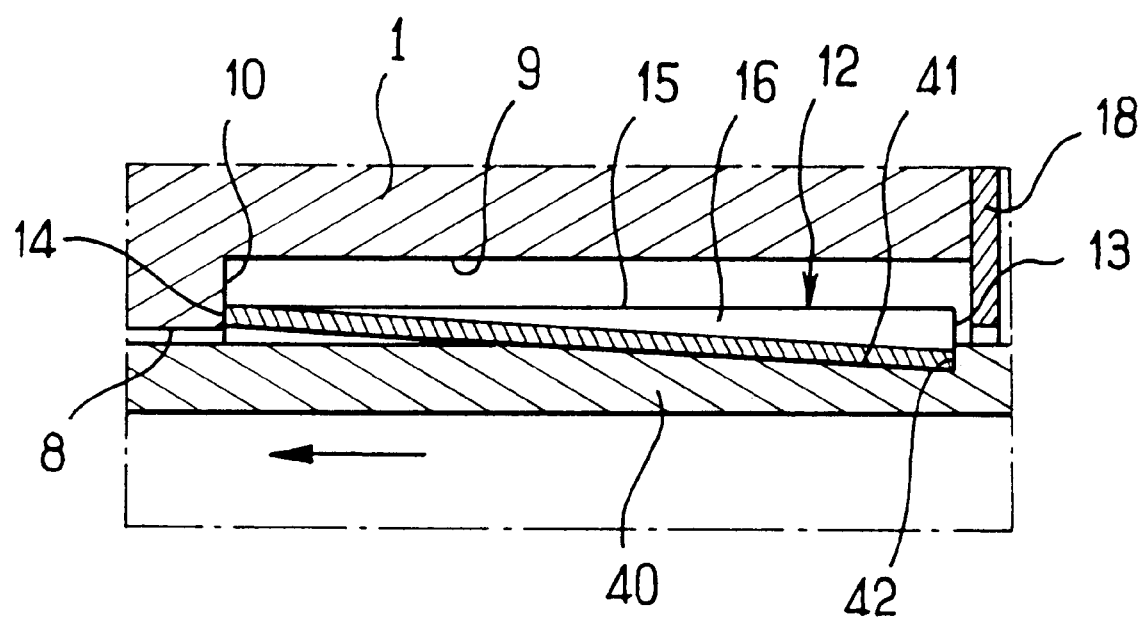
FIG_9a

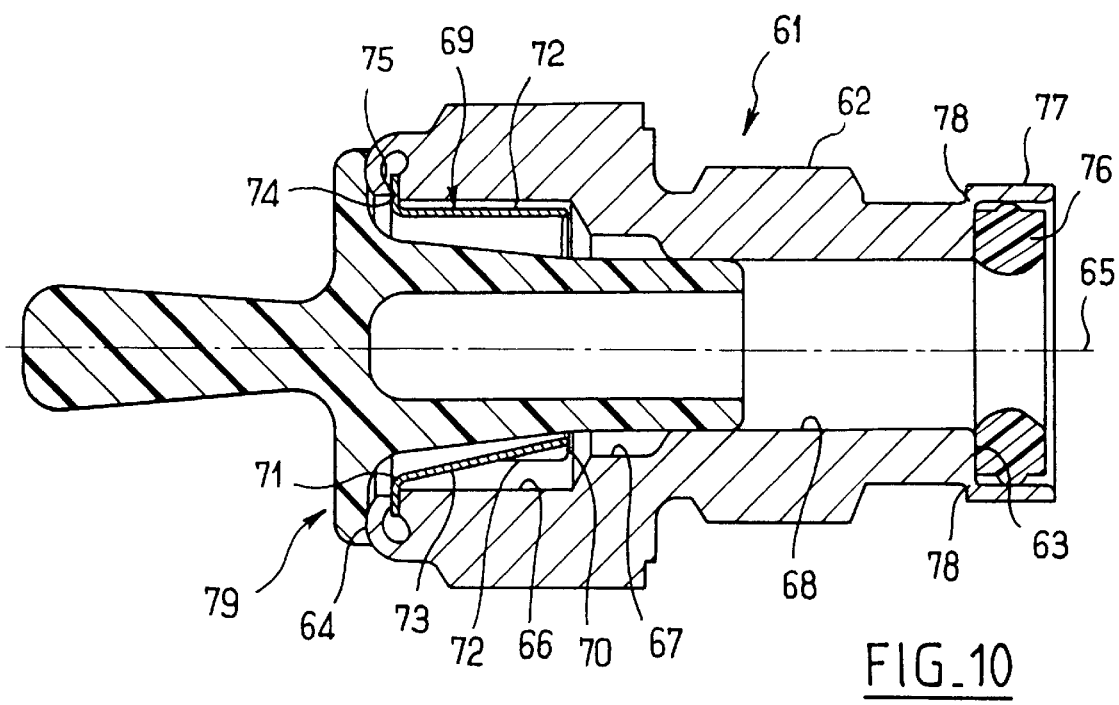
FIG_10
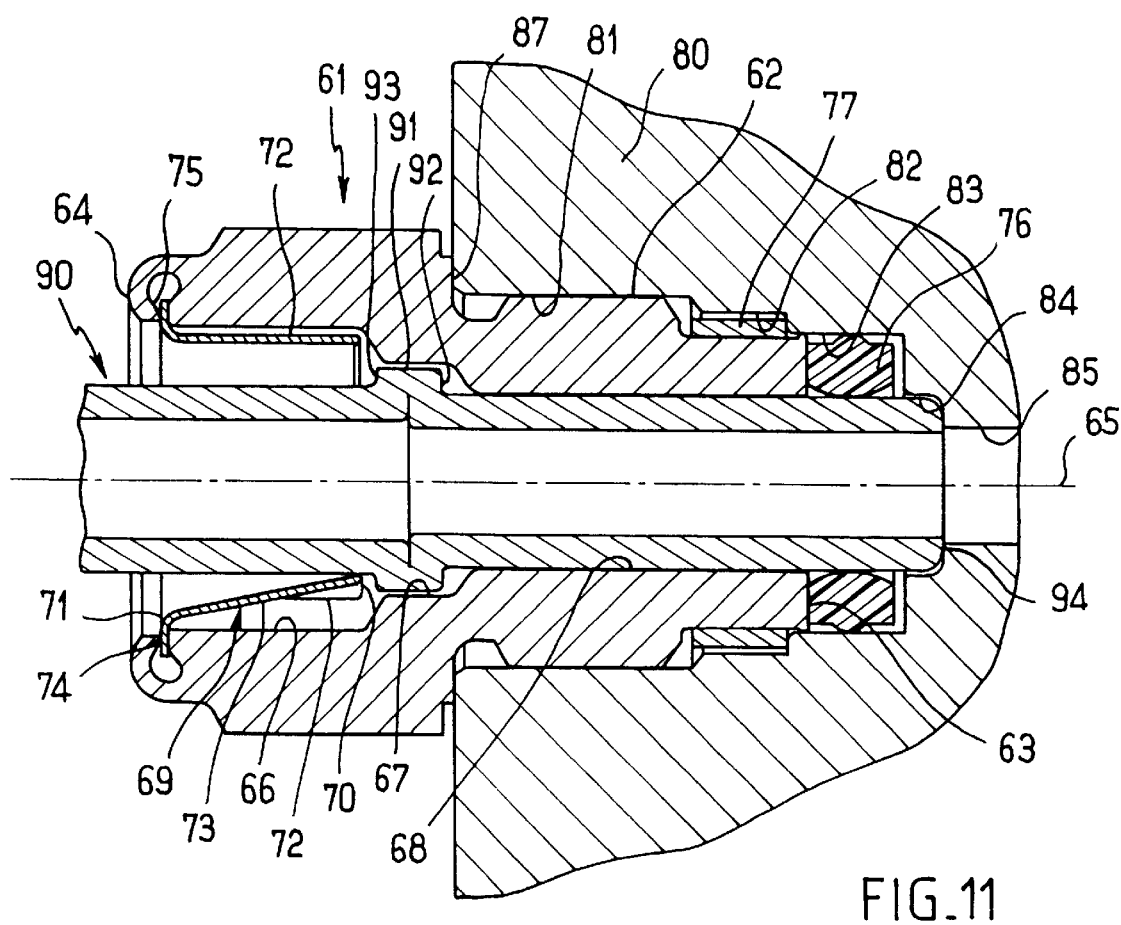
FIG_11

DEVICE FOR QUICK CONNECTION OF A TUBE TO A RIGID ELEMENT

This application is the national phase under 35 U.S.C. §371 of PCT International Application No. PCT/FR00/00087 which has an International filing date of Jan. 17, 2000, which designated the United States of America and was not published in English.

The present invention relates to a device for quick coupling a tube to a rigid element.

BACKGROUND OF THE INVENTION

Quick coupling devices of the "cartridge" type are known for making a leakproof connection of a tube in a bore of a rigid element such as the body of a hydraulic or a pneumatic component. In general, this kind of coupling comprises a tubular insert possessing external means for fixing it in a housing of the rigid element and internal means for locking the tube in the insert, a sealing gasket being disposed between the tube and the housing of the rigid element.

In the most widespread quick coupling devices, the insert is screwed into tapping in the bore of the rigid element and the tube is locked by a deformable anchoring washer having radial claws which "bite" into the outside face of the tube.

The tube is generally not rigidly held in an axial direction in this type of coupling for the following reasons. Firstly, functional clearance can exist between the claw washer and the insert itself. In addition, and above all, the claws are flexible blades which, when traction is applied on the tube, are subjected to elastic buckling such that the greater the traction, the greater the deformation of the teeth, and the greater the axial displacement of the tube relative to the insert.

In fact, the traction force on the tube is generated by the pressure that exists inside the circuit to which the tube belongs. Some circuits are continuously under constant pressure. The tube takes up its position in the insert and under such circumstances couplings with claws are quite satisfactory. In other circuits, pressure varies over a large amplitude range, and sometimes at high frequency. This applies in particular to motor vehicle braking circuits fitted with systems for preventing the brakes locking.

Under those conditions of use, claw couplings present drawbacks. Each claw is subjected to buckling fatigue stress which reduces the lifetime of the ring. In addition, the inside volume of the circuit is not constant since the tube moves relative to the insert under the effect of pressure variations, and that can disturb the operation of certain devices served by the circuit, and in particular devices for preventing brakes from locking. In brake circuit applications, operating pressures can have peak values lying in the range 100 bars to 350 bars, with pulsations at 15 Hertz (Hz).

OBJECTS AND SUMMARY OF THE INVENTION

An object of the invention is to design a quick coupling device in which tube locking in the axial direction is very rigid against forces for withdrawing the tube so that play in the withdrawal direction, if not zero, is at least fixed and predetermined.

According to the invention, this object is achieved by a quick coupling device for coupling a tube to a rigid element, the device comprising a tubular insert possessing external means for fixing it in a bore in the rigid element and internal means for axially locking the tube in the insert opposing at least extraction of the tube, wherein the axial locking means comprise a sleeve placed inside the tubular insert and possessing at least a broad cross-section arranged to bear against an internal abutment member of the tubular insert and a narrow cross-section that is elastically deformable in a radial direction between a rest configuration that is small enough to form an abutment for a shoulder of the tube, such that the sleeve forms a spacer opposing withdrawal of the tube after it has been inserted, and an elastically deformed configuration where it is expanded to enable the shoulder of the tube to pass through during insertion thereof.

In operation, the sleeve is thus interposed between the shoulder of the tube and the internal abutment member of the insert to form a positive abutment for rigidly retaining the tube in the insert. On assembly, the tube is inserted into the insert by radial elastic expansion of the deformable section of the sleeve allowing the shoulder of the tube to pass through. Once this shoulder of the tube has gone past the deformable section of the sleeve, the sleeve retracts behind the shoulder to form an abutment that opposes withdrawal of the tube. Withdrawal forces exerted axially on the tube are thus taken up between the shoulder of the tube and the internal abutment member of the insert by means of the sleeve which forms an undeformable spacer.

In an advantageous embodiment of the sleeve, the broad and narrow sections of the sleeve are situated at its ends. The sleeve has an internal passage that converges continuously from its broad end towards its narrow end. The broad end of the sleeve has a cross-section that is polygonal in shape, while the narrow end of the sleeve has a cross-section made up of a succession of circular arcs whose intersections are connected to the vertices of the polygonal section of the broad end by substantially longitudinal ridges between which the sleeve presents curved outside facets. This provides a sleeve having intrinsic capacity for elastic deformation in the radial direction, while presenting small radial size, and also good resistance to compression. The longitudinal ridges further reinforce the compression strength of the sleeve and oppose buckling thereof.

Advantageously, the sleeve is made as a steel swaging. The sleeve thus presents good characteristics of elasticity and mechanical strength, while being particularly simple and inexpensive to manufacture.

The shoulder of the tube can be constituted by a bearing flank of a neck formed in the outer surface of the tube or of a bead formed on the tube.

The abutment member of the tubular insert can be made in the form of a simple internal shoulder or indeed in the form of a groove having the broad end of the sleeve crimped therein. In the second case, the broad end of the sleeve can be spread outwards to form a collar which is crimped in the groove of the sleeve.

The invention also provides a cartridge for packaging the insert and the sleeve, the cartridge comprising an inner retention sheath having a portion received inside the tubular insert, a guard forming a plug for closing one end of the tubular insert, and at least two elastically flexible branches having respective free ends extending beyond the other end of the insert and fitted with radial projections for retaining the sleeve inside the insert.

Advantageously, between the projecting ends of the branches of the sheath and the insert, the cartridge comprises a washer whose inside diameter is less than the inside diameter of the insert at the corresponding end and whose outside diameter is no greater than the outside diameter of the insert at said end. The washer has at least three resilient tabs that can be folded down along the insert on the outside thereof.

The free ends of the resilient branches of the sheath are fitted beyond the insert and the washer with an annular sealing gasket, the radial projections of these branches constituting means for retaining the sleeve, the washer, and the gasket axially relative to the insert. The free ends of the branches of the sheath are externally chamfered in such a manner as to force the branches of the sheath to deflect towards one another when their ends penetrate into an associated portion of the bore of the rigid element.

BRIEF DESCRIPTION OF THE DRAWINGS

Other characteristics and advantages of the invention will appear on reading the following description of particular embodiments, given as non-limiting examples.

Reference is made to the accompanying drawings, in which:

FIG. 1 is an axial section view of a cartridge for a coupling device constituting a first embodiment of the invention;

FIG. 2 is a detail perspective view of the sleeve on its own, extracted from the device of FIG. 1;

FIG. 3 is a detail view in axial section of the FIG. 2 sleeve;

FIGS. 4 and 5 are views respectively along arrows IV and V of FIG. 3;

FIGS. 6 and 7 are axial section views showing how the coupling device is mounted in an associated housing of a rigid element to which the tube is to be coupled;

FIGS. 8 and 9 are axial section views showing how the tube is inserted into the insert and locked axially;

FIG. 9a is an enlarged view of the box marked A in FIG. 9;

FIG. 10 is an axial section view of a cartridge for a coupling device constituting a second embodiment of the invention; and FIG. 11 is an axial section view of the device mounted in an associated housing of the rigid element and having the tube coupled thereto.

MORE DETAILED DESCRIPTION

With references to FIGS. 1 to 9 and in particular with reference to FIG. 1, the quick coupling device of the invention for coupling a tube to a rigid element comprises a tubular insert 1 having an outside fixing thread 2, a front transverse face 3, and a rear transverse face 4.

On the inside, the tubular insert 1 presents a stepped bore about an axis 5. This bore possesses in succession, going from the rear face 4 towards the front face 3, an inlet chamfer 7, a first cylindrical portion 8, and a second cylindrical portion 9 of larger diameter than the first portion 8. There is an internal transverse shoulder 10 between the first and second portions 8 and 9.

A locking sleeve 12 is placed in the second cylindrical portion 9 of the stepped bore of the insert 1. As can be seen more clearly in FIGS. 2 to 5, this locking sleeve has a narrow front end 13 and a broad rear end 14. The narrow front end 13 presents a cross-section that is made up of a succession of reentrant circular arcs. The circular arcs form intersections between one another which are relatively sharp in this example, but which could advantageously be more rounded so as to make the sleeve 12 easier to manufacture. The broad rear end 14 has a cross-section that is polygonal (or quasi-polygonal with sides that can curve outwards a little). Longitudinal stiffening ridges 15 that are substantially parallel to one another connect the vertices of the polygonal section at the broad rear end 14 to the intersections between the circular arcs in the section of the narrow front end 13. Between the ridges 15, the sleeve 12 presents external side facets 16 that are curved and concave. Specifically, the ridges 15 are six in number, the section of the broad rear end 14 being hexagonal. A detailed definition of the shape of the sleeve 12 is also given by FIGS. 2 to 5 which are given by way of description.

The sleeve 12 can advantageously be made as a steel swaging. It can thus be made simply and quickly, and is therefore inexpensive. By using steel, it is possible to combine satisfactory characteristics of elasticity and of compression strength, and this material is also inexpensive and well suited to manufacture by swaging. The thickness of the sleeve 12 depends on the dimensions of the coupling and on the forces to which it will be subjected. For the coupling devices used in the automotive industry, a thickness lying in the range 0.1 millimeters (mm) to 0.2 mm had been found to be good. Similarly, the number of ridges 15 on the sleeve 12 can be arbitrary, but preferably lies in the range 3 to 12.

The sleeve 12 thus presents an internal passage 17 on the axis 5 which converges continuously from the broad rear end 14 towards the narrow front end 13 of the sleeve 12. The shape of the narrow front end 13 in the form of a succession of circular arcs, and the curved shape of the side facets 16 give the sleeve 12, and in particular its narrow front end 13, the capacity to deform elastically in a radial direction. In other words, the narrow front end 13 of the sleeve 12 is elastically expandable.

The sleeve 12 is of a length close to the length of the second cylindrical portion 9 of the bore in the tubular insert 1. Its broad rear end 14 comes into abutment against the internal shoulder 10 of the insert 1. Its narrow front end 13 comes into abutment against a washer 18 placed against the front face 3. This washer 18 possesses external tabs 18.1 folded forwards through an angle that is less than a right angle, and these tabs are elastically flexible.

The coupling device also has an annular sealing gasket 19 for providing sealing between the tube and the rigid element to which it is to be coupled, as is explained in greater detail below.

Before the device is mounted on the rigid element to which coupling is to be made, the sealing gasket 19 is held in particular pressed against the washer 18 by an internal retention sheath 20. The assembly constituted by the insert 1, the sleeve 12, the gasket 19, and the sheath thus forms a preassembled cartridge ready for use.

The sheath 20 has a fixing portion 21 engaged in the first cylindrical portion 8 of the bore of the tubular insert 1, and two elastically deformable branches 22 separated by slots 23. The deformable branches 22 have free front ends 24 that project from the front face 3 of the tubular insert 1 and that present respective seats 25 defined at the front by a projection in the form of a conical shoulder 26 to constitute an abutment for the gasket 19. The free front ends 24 of the branches 22 also present respective external chamfers 24.1.

Beyond the fixing portion 21, the sheath is provided with a handle 27 and with a closing and positioning guard 28 which comes into abutment against the rear face 4 of the insert 1. The guard 28 thus closes the bore of the tubular insert 1, thereby ensuring that impurities do not penetrate therein during transport, storage, and assembly operations. Furthermore, the distance between the guard 28 and the conical shoulder 26 defining the seat for the gasket 19 is selected so that the shoulder 26 provides support with little clearance for the gasket 19, the washer 18, and the locking sleeve 12 against the internal shoulder 10 of the tubular insert 1.

The coupling device is mounted on a rigid element 30 in the following manner, as shown in FIGS. 6 to 9.

The rigid element 30 must initially be bored to form a stepped bore. This bore comprises four portions of diameters that decrease going from the outside towards the inside. Thus, there is a large diameter portion 31 that is tapped and suitable for receiving the insert 1, a portion 32 of smaller diameter than the portion 31 for receiving the tabs 18.1 of the washer 18, a portion 33 of smaller diameter than the portion 32 for receiving the gasket 19, a portion 34 whose diameter corresponds substantially to the outside diameter of the tube to be coupled, and a portion 35 whose diameter is substantially equal to the inside diameter of said tube.

On assembly, the insert 1 is screwed by means of its external thread 2 into the tapping in the first portion 32 of the stepped bore of the rigid element 30. The sealing gasket 19 is compressed externally so as to penetrate into the second portion 33 of the bore, and it is compressed on each of its flanks between the washer 18 and a shoulder 37 between the second and third portions 33 and 34 of the bore in the rigid element 30. Simultaneously, the resilient tabs 18.1 of the washer 18 penetrate into the portion 32 of the bore in the insert 1 and, by friction, prevent the washer 18 from rotating so as to ensure that it is not rotated by the insert 1 which could harm the gasket 19 by rubbing against it. The free ends 24 of the branches 22 of the retaining sheath 20 penetrate into the third portion 34 of the bore of the rigid element 30 and the outside chamfers thereon 24.1 force the branches 22 of the sheath 20 to deflect a little towards each other by elastic deformation, thereby releasing the sheath and avoiding the sheath rubbing against the gasket at the end of screwing in the insert 1. Once the insert has been screwed in, the washer 18 comes into abutment against a shoulder 36 between the first and second portions 32 and 33 of the stepped bore of the rigid element 30.

As shown in FIG. 7, a traction force is exerted on the sheath 20 via the handle 27 to withdraw the retention sheath 20 from the tubular insert 1. The fixing portion 21 slides inside the first cylindrical portion 8. The ends 24 of the branches 22 of the sheath 20 which slide initially over the gasket 19 and then over the narrow front end 13 of the locking sleeve 12, forms the branches 22 to deflect elastically towards each other so as to enable the sheath 20 to be withdrawn without forcing against the elasticity of the gasket 19 and of the sleeve 12.

Once the sheath 20 has been withdrawn, the tube 40 which is to be coupled to the rigid element 30 is inserted into the tubular insert 1 as shown in FIG. 8. This tube has an outside diameter close to the diameter of the first cylindrical portion 8 of the bore in the tubular insert 1, and on the outside it presents a neck 41 that defines a shoulder 42. Specifically, the neck 41 is conical in shape, converging towards the free front terminal face 43 of the tube 40.

The front end 44 of the tube 40 is rounded or chamfered and penetrates into the converging internal passage 17 in the sleeve 12, and then by sliding against the internal surface of the sleeve 12, it forces the front end 13 of the sleeve 12 to expand elastically so as to enable the front end of the tube 40 to pass through. When the shoulder 42 goes past the narrow front end 13 of the sleeve 12, the sleeve retracts spontaneously into the neck 41 under the effect of its own elasticity and thus locks the tube 40 inside the tubular insert 1.

As shown by FIGS. 9 and 9a, any extraction force exerted on the tube 40, in particular due to a rise of the pressure inside the tube 40, is taken up by the sleeve 12 via the shoulder 42, and the sleeve 12 is itself prevented from moving axially by coming into abutment against the internal shoulder 10 of the tubular insert 1. The sleeve 12 is thus subjected to high levels of compression stress which it takes up completely safety because of its special shape described above and shown in FIGS. 2 to 5. In particular, its longitudinal stiffening ridges 15 significantly reinforce the strength of the sleeve 12 and in particular avoid any risk of it buckling.

Beyond the shoulder 42, the front end 44 of the tube 40 comes into contact with the sealing gasket 19 and compresses it slightly so that sealing between the tube 40 and the rigid element 30 is ensured.

FIGS. 10 and 11 show a second embodiment of the invention in which the locking sleeve is crimped in the insert.

As before, the device comprises a tubular insert 61 having an outside thread 62 for fixing purposes, a front transverse face 63, and a rear transverse face 64. On the inside, the tubular insert 61 has a stepped bore around an axis 65. This bore possesses in succession, going from the rear face 64 to the front face 63: first, second, and third cylindrical portions 66, 67, and 68 having progressively smaller diameters.

A locking sleeve 69 is placed in the first portion 66 of the bore in the insert 61. This locking sleeve has a narrow front end 70 and a broad rear end 71. The narrow front end 70 has a cross-section made up of a succession of reentrant circular arcs forming intersections between one another that are angular or slightly rounded. The broad rear end 71 has a cross-section that is polygonal (or quasi-polygonal with sides that may curve slightly outwards). The longitudinal stiffening ridges 72 are substantially parallel with one another and connect the vertices of the polygonal section at the broad rear end 71 to the intersections between the circular arcs of the section at the narrow front end 70. Between the ridges 72, the sleeve 69 presents outside facets 73 that are curved and concave. Specifically, and unlike the first embodiment, there are five ridges 72, and the section at the broad end 71 is pentagonal.

Furthermore, unlike the first embodiment, in this case the sleeve 69 is crimped to the first portion 66 of the bore in the insert 61. More precisely, the broad rear end 71 of the sleeve 69 is spread outwards to form a collar 74 which is crimped in a peripheral groove 75 formed in the vicinity of the rear end of the insert 61 in the first portion 66 of the bore in said insert. The sleeve 69 thus forms a part of the insert 61.

The coupling device also has an annular sealing gasket 76 for providing sealing between the tube and the element to which it is to be coupled. Prior to mounting the device in the rigid element for coupling, the sealing gasket 76 is held in position pressed against the front face 63 of the insert by a snap-off retention and protection skirt 77 in the form of a ring connected to the front end of the insert 61 by a zone of weakness 78 that breaks during assembly so as to enable the skirt to retract onto the insert and release the gasket 76. Thus, the device forms a cartridge that is simpler than in the first-described variant.

Prior to assembly, the device is provided with a sheath 79 that acts solely as a member for closing the rear end of the bore of the insert 61, where the sleeve 69 is installed. The assembly constituted by the insert 61, the sleeve 69 with its snap-off skirt 77, the gasket 76, and the sheath 79 thus forms a preassembled cartridge ready for use.

Prior to mounting, the rigid element 80 of the coupling needs to be bored. The bore formed in this way comprises three portions of progressively smaller diameters going from the outside towards the inside. Thus, there is a first portion 81 of large diameter that is tapped for receiving the outside thread 62 of the insert 61, a second portion 82 of smaller diameter than the portion 81 for receiving the snap-off skirt 77, a third portion 83 of diameter smaller than the outside diameter of the snap-off protection skirt 77 for receiving the gasket 76, a fourth portion 84 whose diameter corresponds substantially to the outside diameter of the tube to be coupled, and a fifth portion 85 whose diameter is substantially equal to the inside diameter of said tube.

When the insert 61 is being mounted its outside thread 62 is screwed into the tapping of the first portion 81 of the stepped bore of the rigid element 80. The snap-off protection skirt 77, on coming to bear against the shoulder formed between the second and third portions 82 and 83 of the stepped bore in the rigid element 80 becomes detached from the insert 61 by the zone of weakness 78 breaking and it retracts by sliding over the front end of the insert 61 (which is of diameter slightly smaller than the inside diameter of the skirt 77). The insert 61 continues its movement into the stepped bore of the rigid element 80 and presses the sealing gasket 76 which bears against the front face 63 of the insert against the inside of the third portion 83 of the stepped bore in the rigid element 80. At the end of its stroke, a shoulder 87 on the insert 61 comes into abutment against the rigid element 80.

Once the sheath 79 has been withdrawn, the tube 90 for coupling to the rigid element 80 is inserted into the insert 61. This tube has an outside diameter close to the diameter of the third portion 68 of the stepped bore in the insert 61 and it presents a bead 91 formed to be received in the second portion 67 of the stepped bore in the insert 61. The bead 91 on the tube 90 forms a front shoulder 92 and a rear shoulder 93.

The tube 90 is inserted fully until its front end 94 comes into abutment against the shoulder formed between the fourth and fifth portions 84 and 85 of the stepped bore in the rigid element 80. While the tube 90 is being inserted, the bead 91 penetrates into the converging internal passage of the sleeve 69 and, by sliding over the internal surface of this sleeve, it forces the narrow front end 70 of the sleeve 69 to expand elastically so as to allow the tube to pass through. Once the bead 91 has gone past the narrow front end 70 of the sleeve 69, the sleeve retracts spontaneously behind the rear shoulder 93 under the effect of its own elasticity and thus locks the tube 90 in the tubular insert 61. Any traction force exerted on the tube 90 is taken up via the bead 91 by the sleeve 69 which is itself prevented from moving axially by being crimped in the peripheral groove 75 in the tubular insert 61.

The invention is not limited to the embodiments described above, but on the contrary covers any variant using equivalent means to reproduce the essential characteristics of the invention. In particular, although a locking sleeve is described having outside facets that are concave, it would also be possible to make a locking sleeve having outside facets that are convex, in which case the narrow end of the sleeve would present a hexagonal section and the broad end would present a section that is circular or made up of a succession of outwardly convex circular arcs. In general, it is also possible to make a locking sleeve of arbitrary shape with a broad end and a narrow end and possessing capacity to expand elastically at its narrow end.

What is claimed is:

1. A quick coupling device for a tube provided with a shoulder near a free end thereof to be coupled to a rigid element, the device comprising a tubular insert possessing external means for fixing it in a bore in the rigid element and internal locking means for axially locking the tube in the insert opposing at least extraction of the tube, wherein said locking means comprise a sleeve placed inside the tubular insert and having a first end with a broad cross-section arranged to bear against an internal abutment member of the tubular insert and a second end with a narrow cross-section that is elastically deformable in a radial direction between a rest configuration that is small enough to form an abutment for said shoulder of the tube, such that the sleeve forms a spacer opposing withdrawal of the tube after it has been inserted, and an elastically deformed configuration where it is expanded to enable the shoulder of the tube to pass through during insertion thereof and wherein said second end of the sleeve is made of an uninterrupted wall which has a cross-section made up of a succession of curved arcs.

2. A device according to claim 1, wherein the sleeve has an internal passage that converges continuously from its first, broad end towards its second, narrow end.

3. A device according to claim 2, wherein the first end of the sleeve has a cross-section that is polygonal in shape defining vertices belonging to substantially longitudinal ridges between which said sleeve presents curved outside facets.

4. A device according to claim 3, wherein the outside facets of the sleeve are concave.

5. A device according to claim 4, wherein said longitudinal ridges of the sleeve are substantially parallel to one another.

6. A device according to claim 1, wherein the sleeve is made of swaged steel and has a thickness in the range 0.1 mm to 0.2 mm.

7. A device according to claim 3, wherein the sleeve has a number of ridges lying in the range 3 to 12.

8. A device according to claim 1, wherein the shoulder of the tube is constituted by a bearing flank of a neck formed in the outside surface of the tube.

9. A device according to claim 1, wherein the shoulder of the tube is constituted by a bearing flank of a bead formed on the tube.

10. A device according to claim 1, wherein the abutment member of the tubular insert is made in the form of an internal shoulder.

11. A device according to claim 1, wherein the abutment member of the tubular insert is made in the form of a groove in which the broad end of the sleeve is crimped.

12. A device according to claim 11, wherein the broad end of the sleeve is spread outwards to form a collar which is crimped in the groove of the insert.

13. A cartridge for packaging the insert and the sleeve contained in the coupling device according to claim 1, the cartridge comprising an inner retention sheath having a portion received inside the tubular insert, a guard forming a plug for closing one end of the tubular insert, and at least two elastically flexible branches having respective free ends extending beyond the other end of the insert and fitted with radial projections for retaining the sleeve inside the insert.

14. A cartridge according to claim 13, including a washer between the insert and the projecting ends of the branches of the sheath, the washer having an inside diameter smaller than the inside diameter of the insert and having an outside diameter not greater than the outside diameter of the insert at said end.

15. A cartridge according to claim 14, wherein the washer has at least three resilient tabs suitable for folding down along the outside of the insert.

16. A cartridge according to claim 14, wherein the free ends of the elastic branches of the sheath are fitted beyond the insert and the washer with an annular sealing gasket, the radial projections of said branches constituting the means for axially retaining the sleeve, the washer, and the gasket relative to the insert.

17. A cartridge according to claim 13, wherein the free ends of the branches of the sheath have external chamfers arranged to force deflection of the branches of the sheath towards each other during penetration of the ends into an associated portion of the bore of the rigid element.

18. A cartridge for packaging the device according to claim 12, wherein the end of the tubular insert situated remote from the sleeve-retaining groove is extended by a snap-off skirt for holding a sealing gasket, and the cartridge includes a plug for closing the bore of the insert fitted with the sleeve.

* * * * *